United States Patent
Rothschild

(10) Patent No.: US 12,548,441 B1
(45) Date of Patent: Feb. 10, 2026

(54) AI-ASSISTED VEHICLE COMMUNICATION AND SAFETY SYSTEM FOR TAILGATING DETECTION

(71) Applicant: Leigh M. Rothschild, Miami, FL (US)

(72) Inventor: Leigh M. Rothschild, Miami, FL (US)

(*) Notice: Subject to any disclaimer, the term of this patent is extended or adjusted under 35 U.S.C. 154(b) by 0 days.

(21) Appl. No.: 19/170,998

(22) Filed: Apr. 4, 2025

(51) Int. Cl.
*G08G 1/0967* (2006.01)
*B60Q 1/50* (2006.01)
(Continued)

(52) U.S. Cl.
CPC ..... *G08G 1/096725* (2013.01); *B60Q 1/5035* (2022.05); *B60W 30/12* (2013.01); *B60W 30/16* (2013.01); *B60W 50/0098* (2013.01); *B60W 50/14* (2013.01); *B60W 60/0015* (2020.02); *G06V 10/776* (2022.01); *G06V 10/95* (2022.01); *G06V 20/58* (2022.01); *G06V 20/625* (2022.01); *G08G 1/096775* (2013.01); *G09G 3/32* (2013.01); *B60W 2050/0028* (2013.01); *B60W 50/0097* (2013.01); *B60W 2050/143* (2013.01); *B60W 2050/146* (2013.01); *B60W 2420/403* (2013.01); *B60W 2420/408* (2024.01); *B60W 2552/00* (2020.02); *B60W 2554/4041* (2020.02); *B60W 2554/4046* (2020.02);
(Continued)

(58) Field of Classification Search
CPC ....... G08G 1/096725; G08G 1/096775; B60Q 1/5035; B60W 30/12; B60W 30/16; B60W 50/0098; B60W 50/14; B60W 60/0015; B60W 50/0097; B60W 2050/0028; B60W 2050/143; B60W 2050/146; B60W 2420/403; B60W 2420/408; B60W 2552/00; B60W 2554/4041; B60W 2554/4046; B60W 2555/20; B60W 2556/10; B60W 2556/45; B60W 2720/10; B60W 2754/30; G06V 10/776; G06V 10/95; G06V 20/58; G06V 20/625; G06V 2201/08; G09G 3/32; G09G 2380/10
See application file for complete search history.

(56) References Cited

U.S. PATENT DOCUMENTS

| | | | |
|---|---|---|---|
| 8,504,233 B1 * | 8/2013 | Ferguson | B60W 60/00 340/463 |
| 9,050,930 B2 * | 6/2015 | Walsh | B60Q 1/535 |

(Continued)

*Primary Examiner* — Babar Sarwar
(74) *Attorney, Agent, or Firm* — Dobbin IP Law, P.C.; Geoffrey E. Dobbin

(57) ABSTRACT

A method for detecting and mitigating tailgating behavior in vehicle environment is disclosed. The method includes receiving real-time data from sensors integrated into a vehicle. The real-time data comprises information related to the surroundings of the vehicle. The method comprises analyzing the real-time data based on using Artificial Intelligence (AI) models extracted from a memory, to detect patterns and behaviors of the vehicle. The method includes identifying tailgating behavior based on the patterns and behaviors of the vehicle. The method includes validating accuracy of the identified tailgating behavior using the AI models. The method includes generating an alert to a user of the vehicle based on the validation of the accuracy of the identified tailgating behavior. The method comprises enabling an autonomous control system integrated with the vehicle to adjust speed and lane positioning of the vehicle based on the alert.

18 Claims, 6 Drawing Sheets

(51) Int. Cl.
  *B60W 30/12* (2020.01)
  *B60W 30/16* (2020.01)
  *B60W 50/00* (2006.01)
  *B60W 50/14* (2020.01)
  *B60W 60/00* (2020.01)
  *G06V 10/776* (2022.01)
  *G06V 10/94* (2022.01)
  *G06V 20/58* (2022.01)
  *G06V 20/62* (2022.01)
  *G09G 3/32* (2016.01)

(52) U.S. Cl.
  CPC ..... *B60W 2555/20* (2020.02); *B60W 2556/10* (2020.02); *B60W 2556/45* (2020.02); *B60W 2720/10* (2013.01); *B60W 2754/30* (2020.02); *G06V 2201/08* (2022.01); *G09G 2380/10* (2013.01)

(56) References Cited

U.S. PATENT DOCUMENTS

| | | | | |
|---|---|---|---|---|
| 9,104,535 | B1 * | 8/2015 | Brinkmann | G07C 5/085 |
| 9,689,982 | B2 * | 6/2017 | Herthan | G01S 13/0209 |
| 9,884,630 | B1 * | 2/2018 | Ross | G07C 5/0808 |
| 10,501,087 | B2 * | 12/2019 | Deragarden | G01P 3/00 |
| 11,127,296 | B2 | 9/2021 | Sung | |
| 11,897,420 | B2 * | 2/2024 | Ette | G06N 3/08 |
| 11,989,949 | B1 * | 5/2024 | Mazumder | G06V 10/774 |
| 12,142,057 | B2 * | 11/2024 | Tamanaha | G06V 20/58 |
| 2004/0236596 | A1 * | 11/2004 | Chowdhary | G08G 1/20 705/26.1 |
| 2010/0302371 | A1 * | 12/2010 | Abrams | G08G 1/0175 348/149 |
| 2013/0057397 | A1 * | 3/2013 | Cutler | G08G 1/167 701/25 |
| 2017/0236052 | A1 * | 8/2017 | Israelsson | G01N 19/02 706/21 |
| 2018/0037227 | A1 * | 2/2018 | D'sa | B60W 30/16 |
| 2018/0046193 | A1 * | 2/2018 | Takada | G05D 1/0276 |
| 2018/0072220 | A1 | 3/2018 | Yan | |
| 2018/0197415 | A1 * | 7/2018 | Kurata | B60K 35/28 |
| 2018/0231976 | A1 * | 8/2018 | Singh | B60W 30/14 |
| 2018/0276485 | A1 * | 9/2018 | Heck | G06N 7/01 |
| 2018/0365888 | A1 * | 12/2018 | Satzoda | G05D 1/0251 |
| 2019/0051184 | A1 | 2/2019 | Lahav et al. | |
| 2019/0210616 | A1 * | 7/2019 | Watkins | B60Q 1/50 |
| 2020/0114815 | A1 * | 4/2020 | Massengill | B60Q 1/535 |
| 2021/0046900 | A1 * | 2/2021 | Ette | B60R 25/31 |
| 2021/0101526 | A1 | 4/2021 | Lacher et al. | |
| 2021/0300439 | A1 * | 9/2021 | Shigihara | B60W 30/0956 |
| 2021/0380137 | A1 | 12/2021 | Domeyer | |
| 2023/0007910 | A1 | 1/2023 | Choi et al. | |
| 2023/0322218 | A1 * | 10/2023 | Meriçli | B60W 30/165 701/96 |
| 2024/0168748 | A1 * | 5/2024 | Sethu | G06F 8/33 |

\* cited by examiner

Application Server 104

AI-ASSISTED VEHICLE COMMUNICATION AND SAFETY SYSTEM FOR TAILGATING DETECTION

TECHNICAL FIELD

The present invention relates to vehicle safety systems, and more specifically relates to a vehicle communication and safety system designed to detect and mitigate tailgating behavior using AI-assisted technology and advanced sensor arrays.

BACKGROUND

Tailgating is a major cause of road accidents, hence an issue in vehicular traffic management. Conventional means to follow the issue of tailgating primarily depend on the attentiveness and judgment of the driver, along with essential tools available, such as rear-view mirrors and, more recently, rear-view cameras. While some modern vehicles have proximity sensors and warning systems to notify the driver, either by sound or video, that a car is too close behind, these systems are passive and depend on the driver's reaction. Some automated assistance is provided in this regard by Adaptive Cruise Control (ACC) systems through its features of maintaining a safe gap behind the leading vehicle; nevertheless, it does not take into consideration the behavior of the following vehicles. Moreover, these traditional systems work only by the level of intervention by the driver and lack a provision to curb tailgating from behind.

Traditional vehicles rely on rear-view mirrors and, more recently, rear-view cameras to help drivers to monitor the distance between their vehicle and those behind them. While these tools provide visual aids, they require constant attention and judgment from the driver, which can be challenging in fast-paced or high-stress driving situations. Conversational systems are equipped with proximity sensors that alert drivers when another vehicle is too close. These systems typically use ultrasonic or radar sensors to detect nearby objects and provide audible or visual warnings to the driver. However, these systems are often limited to warning the driver without taking any corrective action. Many existing systems use radar and cameras to maintain a safe distance from the vehicle ahead by automatically adjusting the vehicle's speed. While ACC enhances safety for forward collisions, it does not address tailgating from vehicles behind. This limitation hinders the system's ability to maintain user engagement and satisfaction throughout the conversation. Conventional vehicles use brake lights to signal to the driver behind that the vehicle is slowing down or stopping. This passive communication relies on the reaction time and attentiveness of the following driver and does not provide specific warnings about tailgating behavior. Conventional systems rely heavily on driver attentiveness and judgment and systems are often lacking in stressful or complex driving conditions, human error can lead to delayed reactions, increasing the risk of rear-end collisions. Most existing systems only alert drivers to potential dangers without taking proactive steps to mitigate the risk. Traditional systems often lack the proximity sensors and warning systems do not intervene to adjust the vehicle's speed or create a safe distance automatically. Conventional brake lights and turn signals offer limited means of communication, leading to potential risks of not conveying specific messages or instructions to following drivers, especially in situations where tailgating occurs. In the event of a rear-end collision, conventional systems do not typically provide recorded evidence of the incident. This lack of documentation can complicate accident investigations and liability determinations.

Several technologies and systems have been proposed in the prior art to address various aspects of vehicle safety, including proximity detection and communication with trailing vehicles. For example, Patent US20210380137A1-Multi-stage external communication of vehicle motion and external lighting: This prior art describes a method for communication between an autonomous vehicle and external road users using external cameras, LiDAR, and radar sensors. While it provides a mechanism for warning external road users through flashing lights, it does not address tailgating behavior specifically or offer real-time corrective actions to maintain a safe distance. US20190051184A1-Reverse-facing anti-collision system: This prior art focuses on alerting trailing vehicles of potential collision risks using rear-facing sensors and visual alerts, such as brake lights or additional LEDs. However, the system does not employ advanced AI models or adaptive measures to adjust the speed or provide personalized warnings to trailing drivers. US20210101526A1-Method for assisting a driver during overtaking operations: This prior art uses environmental data and projections to aid a vehicle during overtaking. Although it enhances forward communication between vehicles, it does not address the issue of managing tailgating behavior from vehicles behind. Further U.S. Pat. No. 11,127,296B2-Apparatus and method for inducing safe driving of a surrounding vehicle: This prior art describes blinking external lamps to alert surrounding vehicles. However, the solution is limited to visual warnings and lacks comprehensive tailgating detection using AI or real-time data analysis. Furthermore US20180072220A1-Collision avoidance system for vehicles: This prior art uses proximity sensors and projectors to display warnings to trailing vehicles. Despite its capability to visually warn following vehicles, it does not document incidents or incorporate predictive modeling to proactively mitigate tailgating risks and US20230007910A1-Apparatus and method for communicating driving condition of vehicle: This prior art involves communication of vehicle status to surrounding vehicles through lighting systems. However, it does not include detailed imaging systems, advanced incident documentation, or adaptive speed control to address tailgating.

Despite advancements in vehicle safety technologies, existing solutions fail to adequately address the issue of tailgating through an integrated approach that combines detection, communication, intervention, and documentation. Therefore, there is need for the new vehicle communication and safety system that addresses these limitations of the conventional system by integrating advanced AI technology, sensor arrays, and alphanumeric LED displays into the vehicle's rear lighting system and provide Real-Time Tailgating Detection, Proactive Intervention, Direct Communication with Following Drivers, and Incident Documentation.

As a result, there is a need for a method and a system that not only detects and mitigates tailgating behavior but also enhances driver confidence, promotes safer driving habits, and ensures accountability through robust incident documentation.

As a result, there is a need for a method and a system that offers a comprehensive solution to the limitations of conventional methods, enhancing road safety through advanced detection, proactive intervention, direct communication, and detailed incident documentation.

Further limitations and disadvantages of conventional and traditional approaches will become apparent to one of skill in the art, through the comparison of described systems with some aspects of the present disclosure, as set forth in the remainder of the present application and with reference to the drawings.

SUMMARY

A method for detecting and mitigating tailgating behavior in vehicle environment is disclosed. The method includes receiving real-time data from sensors integrated into a vehicle. The real-time data comprises information related to the surroundings of the vehicle. The method comprises analyzing the real-time data based on using Artificial Intelligence (AI) models extracted from a memory, to detect patterns and behaviors of the vehicle. The method includes identifying tailgating behavior based on the patterns and behaviors of the vehicle. The method includes validating accuracy of the identified tailgating behavior using the AI models. The method includes generating an alert to a user of the vehicle based on the validation of the accuracy of the identified tailgating behavior. The method comprises enabling an autonomous control system integrated with the vehicle to adjust speed of the vehicle based on the alert.

In some implementations, the method comprises controlling, by the application server, a head display unit installed in the vehicle to display the warning message and the guidance message. The head display unit comprises an alphanumeric Light Emitting Display (LED) display integrated into rear headlights of the vehicle. The alphanumeric LED display is configured to display customizable messages input by the user of the vehicle.

In some implementations, the method further comprises recording, by the application server, high-resolution video and still images of tailgating incidents using an imaging capture system integrated into rear headlights of the vehicle. The imaging capture system includes night vision capabilities to ensure high-quality recording in low-light conditions.

In some implementations, the method further comprises generating reports for relevant authorities based on the high-resolution video and the still images of the tailgating incidents.

In some implementations, the sensors comprise image sensors, LIDAR sensors, RADAR sensors, and infrared sensors.

In some implementations, the sensors comprise radar sensors configured to enhance the detection of surrounding objects.

In some implementations, the head display unit is further configured to provide audio alerts.

In some implementations, the autonomous control system is further configured to collaborate with a lane-keeping assist system to ensure optimal vehicle positioning during speed adjustments.

In some implementations, the ML models use historical driving behavior and contextual data for identifying the tailgating behavior. The historical driving behavior and contextual data such as weather conditions, road infrastructure, and traffic patterns for predictive analysis.

A system for detecting and mitigating tailgating behavior in vehicle environment. The system comprises a processor and a memory communicatively coupled with the processor, wherein the memory stores processor-executable instructions, which on execution cause the processor to receive real-time data from a plurality of sensors integrated into a vehicle. The real-time data information on surrounding vehicles, such as their speed, distance, and relative position, as well as contextual factors like lane availability and traffic conditions. Using AI models, the processor identifies tailgating behavior and validates its accuracy. Based on the analysis, the system autonomously determines the optimal action: it can speed up the subject vehicle to create a safe buffer, change lanes if possible, or maintain position while alerting the driver to remain cautious. The system provides real-time alerts and guidance to the driver through a head display unit and communicates directly with the trailing driver using alphanumeric LED displays integrated into the rear lights, displaying messages like "BACK OFF." Additionally, the system incorporates an incident documentation component that uses a high-resolution imaging unit to record visual evidence of tailgating incidents. The recorded data is securely stored locally, in the cloud, or on a mobile device for later use in reporting or investigations. By combining advanced AI-driven decision-making, proactive interventions, and comprehensive documentation, the system significantly enhances road safety, mitigates the risks associated with tailgating, and promotes responsible driving behavior.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not to limit the scope in any manner, wherein similar designations denote similar elements.

DETAILED DESCRIPTION

Figure 1:
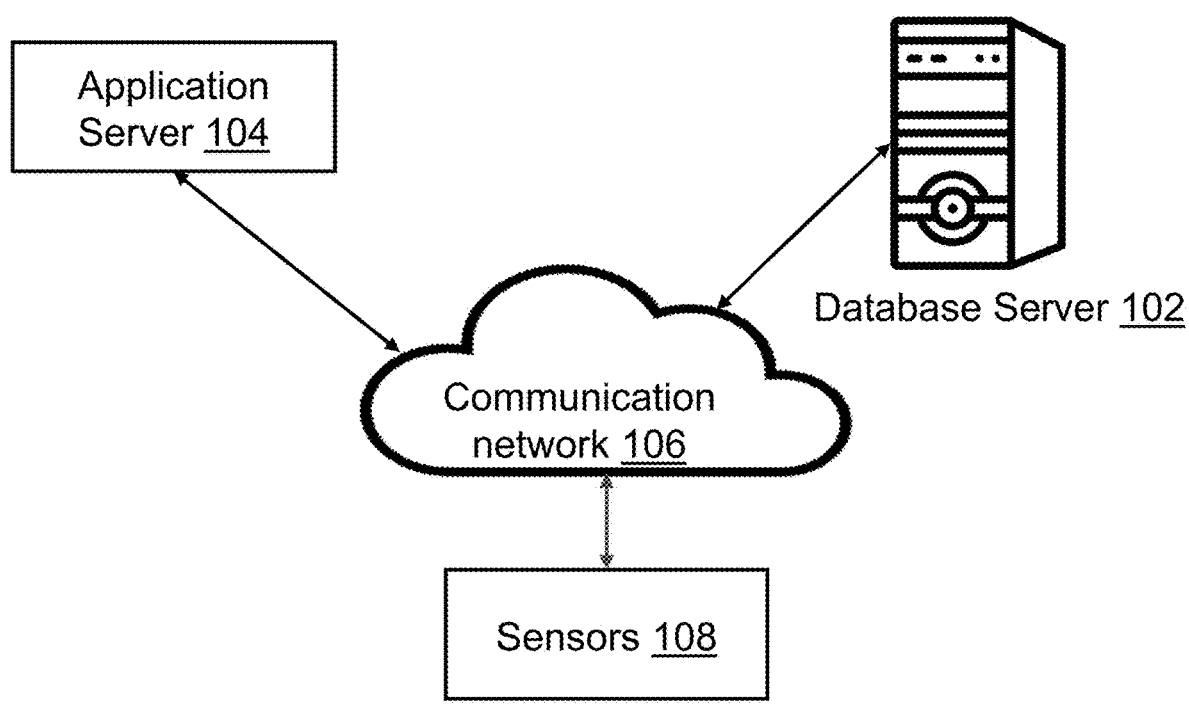
FIG. 1 is a block diagram that illustrates a system environment in which various embodiments of the method and the system may be implemented.

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

The present disclosure addresses the limitations of conventional vehicle safety systems by introducing an advanced solution that integrates a comprehensive array of strategically positioned sensors, including image sensors, LIDAR, RADAR, and infrared sensors. These sensors gather extensive environmental data, which is processed using machine learning techniques to accurately detect and classify surrounding objects and vehicles. The system proactively mitigates tailgating risks, significantly enhancing driving safety and performance, by dynamically adjusting vehicle parameters like speed and providing driver alerts. This approach overcomes the rigidity of traditional rule-based algorithms and the limitations of basic sensor data interpretation, providing a more adaptive and intelligent response to the complex, dynamic nature of real-world driving environments. The present disclosure's ability to differentiate between normal driving behaviors and tailgating, understand the intentions of trailing vehicles, and integrate contextual factors ensures a higher level of precision and reliability in tailgating avoidance and overall vehicle safety.

The primary objectives of the present disclosure are to enhance the road safety by reducing the risk of rear-end collisions caused by tailgating through proactive detection and intervention. The present disclosure aims to address several technical challenges faced by conventional systems. Another objective of the present disclosure is to provide drivers with real-time alerts about tailgating and, in auto mode, to autonomously adjust the vehicle's speed to maintain a safe distance. Another objective of the present disclosure is to facilitate direct communication with trailing drivers using alphanumeric LED displays, promoting safer driving behavior. Yet another objective of the present disclosure is to ensure continuous adaptation to changing traffic conditions, maintaining optimal safety throughout the vehicle's journey. Yet another objective of the present disclosure is to document incidents involving tailgating or dangerous driving by recording images or videos, which can be used for accident investigations and reporting to authorities. Yet another objective of the present disclosure is to promote driver awareness and responsible driving by providing clear instructions and feedback on safe driving distances.

Yet another objective of the present disclosure is to a Vehicle Communication and Safety System that enhances road safety by addressing the issue of tailgating through a combination of advanced AI technology, sensor arrays, and direct driver communication. Yet another objective of the present disclosure is to detect and mitigate tailgating behavior using AI-assisted technology and advanced sensor arrays. The system includes LIDAR, SONAR, momentum sensors, imaging cameras, and other proximity sensors to monitor the distance between the subject vehicle and a trailing vehicle. AI algorithms analyse this data in real-time to identify tailgating. When tailgating is detected, the system alerts the driver through the vehicle's head unit and, if in auto mode, autonomously adjusts the vehicle's speed to maintain a safe distance. Additionally, the system features alphanumeric LED lights integrated into the rear headlights, which display messages to warn the trailing driver to maintain a safe distance. The rear lights are also equipped with imaging capture arrays to record and store incident data, which can be used for accident investigations or reporting dangerous driving to authorities. This integrated approach enhances road safety by proactively managing tailgating and providing immediate feedback to drivers.

The present disclosure relates to Vehicle Communication and Safety System that enhances road safety by addressing the issue of tailgating. The data collection unit aggregates data from the sensor arrays, wherein the sensor includes LIDAR sensors, SONAR sensors, momentum sensors, imaging cameras, and other proximity sensors. These sensors continuously monitor the distance between the subject vehicle and the trailing vehicle, providing real-time data to the system's processors. The LIDAR and SONAR sensors are particularly effective in detecting the relative distance and speed of the approaching vehicle, while the momentum sensors and cameras offer a comprehensive view of the surrounding environment. This multi-sensor approach ensures accurate and reliable detection of tailgating behavior. The AI algorithms embedded in the system's processors to analyze the data from these sensors to identify when a vehicle is tailgating. Upon detection, the system alerts the driver through the vehicle's head display unit. If the vehicle is in auto mode, the system autonomously calculates whether it can safely accelerate to create a safe distance from the trailing vehicle and adjusts the vehicle's speed accordingly. In driver-assisted mode, the system provides specific instructions to the driver on how to achieve the necessary safe distance. This proactive intervention significantly reduces the risk of rear-end collisions caused by tailgating.

An alphanumeric LED display integrated into the rear headlights. These lights can display messages such as "BACK OFF," "PLEASE PASS ME," or "PLEASE DO NOT TAILGATE MY CAR," directly communicating with the trailing driver. This direct communication not only informs the trailing driver of their unsafe behavior but also encourages them to maintain a safe distance. This feature is particularly useful in situations where visual cues alone, such as brake lights, are insufficient to convey the urgency of the situation. The system also includes an incident documentation component. The rear lights are equipped with imaging capture arrays that can record still frames or videos of incidents. These recordings can be stored locally, in the cloud, or on the driver's mobile device. In the event of an incident, such as a collision or dangerous driving behavior, these images can be automatically sent to nearby authorities, providing valuable evidence for accident investigations and reporting. This feature adds an additional layer of safety and accountability, ensuring that incidents are well-documented and can be reviewed as needed. The Vehicle Communication and Safety System represents a significant advancement in vehicle safety technology. By integrating AI, advanced sensors, and direct communication features, the system provides a comprehensive solution to the limitations of conventional tailgating prevention methods. It enhances driver awareness, promotes responsible driving behavior, and ensures continuous adaptation to changing traffic conditions, ultimately aiming to reduce tailgating-related accidents and improve overall road safety.

FIG. 1 is a block diagram that illustrates a system environment 100 in which various embodiments of the method may be implemented. The system environment 100 typically comprises a database server 102, an application server 104, a communication network 106, and sensors 108, are typically communicatively coupled with each other via the communication network 106.

The database server 102 receives from the system's various sensors, including LIDAR, SONAR, momentum sensors, and imaging cameras with both the first user and second user from a multitude of sources. The database server 102 may process information, historical data, AI model parameters, and recordings of incidents such as tailgating or other dangerous driving behaviors. The database server 102 ensures that all relevant information is readily available for real-time analysis, decision-making, and long-term storage. This data comprises both raw sensor inputs and the outcomes of AI processing, ensuring that the system has a complete record of all monitored activities and detected events. The database server 102 ensures these datasets are updated in real-time as new data becomes available. The database server 102 generates and adapts real-time content such as real-time data processing capabilities, the database server 102 is fundamental to the system's overall functionality. The database server 102 provides a centralized location for all the data required by the system to operate effectively. The database server 102 includes real-time data access for ongoing incident management and immediate reporting, as well as historical data for AI model training and refinement. The historical data enables the AI algorithms to learn from past events, improving their accuracy and reliability over time. Additionally, the database server 102 supports incident management by storing recordings that can be accessed and reviewed to understand the circumstances leading to a particular event. This capability is crucial for post-incident analysis, reporting to authorities, and making informed decisions on enhancing system performance. The availability of comprehensive and organized data within the database server 102 is essential for the seamless and efficient operation of the Vehicle Communication and Safety System.

The database server 102 helps in real-time incident management. When the system detects tailgating or other dangerous driving behaviors, it needs immediate access to relevant data to respond effectively. The database server 102 provides this real-time data access, enabling the system to retrieve and analyze the latest information quickly. This capability is crucial for generating timely alerts to the driver, adjusting vehicle speed through the autonomous control system, and activating the alphanumeric LED displays to warn trailing drivers. Furthermore, in the event of an incident, the database server 102 facilitates rapid access to recorded data for reporting and analysis purposes. This ensures that incidents are thoroughly documented and can be reviewed by authorities or used for post-incident analysis to enhance future system responses.

The application server 104 is a component within the Vehicle Communication and Safety System, tasked with running the core applications and AI algorithms essential for processing sensor data. The application server 104 serves as the computational hub where raw data from various sensors, including LIDAR, SONAR, momentum sensors, and imaging cameras, is aggregated and analyzed. The primary function of the application server 104 is to execute sophisticated AI algorithms that interpret this sensor data to detect tailgating behavior and other potential hazards. By continuously running these applications, the application server 104 ensures that the system remains responsive and accurate in its assessments, providing real-time insights into the vehicle's immediate environment.

The application server 104 handles the real-time analysis and decision-making processes that are critical for effective tailgating detection and mitigation. Upon receiving data from the sensors, the server's AI algorithms process this information to identify patterns indicative of tailgating. These algorithms are trained on vast datasets to recognize both subtle and overt signs of tailgating, such as a vehicle following too closely for a sustained period. Once tailgating behavior is detected, the application server 104 swiftly decides on the appropriate response, which could range from alerting the driver via the head display unit to autonomously adjusting the vehicle's speed or activating warning messages on the alphanumeric LED displays.

The application server 104 is able to take real-time decision-making and is crucial for the system's effectiveness in preventing accidents and enhancing road safety. The server's AI algorithms are designed to operate with minimal latency, ensuring that the system can respond almost instantaneously to detected threats. For instance, when tailgating is identified, the application server 104 processes this information and generates a response in real-time, triggering immediate actions such as notifying the driver and adjusting the vehicle's speed if necessary. This rapid processing capability is essential for maintaining a safe driving environment, as it allows the system to dynamically adapt to changing conditions on the road. The application server's robust processing power and advanced algorithms enable it to handle complex computations and deliver timely, accurate responses that mitigate the risks associated with tailgating and other hazardous driving behaviors.

The communication network 106 facilitates the transmission of data between various sources and the application server 104. The communication network 106 is integral to the Vehicle Communication and Safety System, as communication network 106 facilitates the seamless exchange of data between all system components. This network forms the backbone of the system's data infrastructure, enabling continuous and efficient data flow. By linking various elements such as sensors, the processor, the head display unit, the autonomous control system, the alphanumeric LED displays, and the Imaging Capturing Unit, the communication network 106 ensures that real-time data collected from the vehicle's environment is transmitted promptly to the processor for analysis. The communication network 106 supports various communication protocols to handle different types of data, ensuring that both high-priority and routine information are effectively managed and transmitted across the system.

The communication network 106 ensures reliable and timely communication between all interconnected components of the system. This reliability is crucial for the system's overall performance, particularly in safety-critical applications where delays or data loss can have serious consequences. The communication network 106 design ensures that sensor data reaches the processor without interruption, allowing the AI algorithms to perform real-time analysis and make quick decisions regarding tailgating detection and mitigation. Additionally, the communication network 106 enables the processor to send immediate alerts and instructions to the head display unit, adjust the vehicle's speed through the autonomous control system, and activate warning messages on the alphanumeric LED displays. Furthermore, communication network 106 supports the transmission of incident recordings from the Imaging Capturing Unit to storage or directly to authorities. By maintaining a consistent and efficient data flow, the communication network 106 plays a vital role in the system's ability to enhance road safety and prevent accidents.

The sensors 108 encompass various types, including LIDAR, SONAR, momentum sensors, and imaging cameras. Each sensor type serves a specific purpose. For example, LIDAR sensors use laser pulses to measure distances and create detailed 3D maps of the vehicle's surroundings, SONAR sensors employ sound waves to detect objects and measure distances, momentum sensors capture the vehicle's acceleration and deceleration, and imaging cameras provide real-time visual data.

The sensors 108 continuously collect real-time data about the vehicle's surroundings, focusing on crucial metrics such as the distance and speed of trailing vehicles. This constant data collection ensures that the system has up-to-date information about the driving environment, allowing for accurate monitoring of potential tailgating situations and other hazardous behaviors.

The sensors 108 may provide the raw data necessary for the AI algorithms to function effectively. By providing comprehensive and precise data, the sensors 108 enable the AI to detect tailgating and other potentially dangerous driving behaviors. The raw data forms the foundation for the system's real-time analysis, decision-making, and subsequent actions to enhance vehicle safety and mitigate risks on the road.

Figure 2:
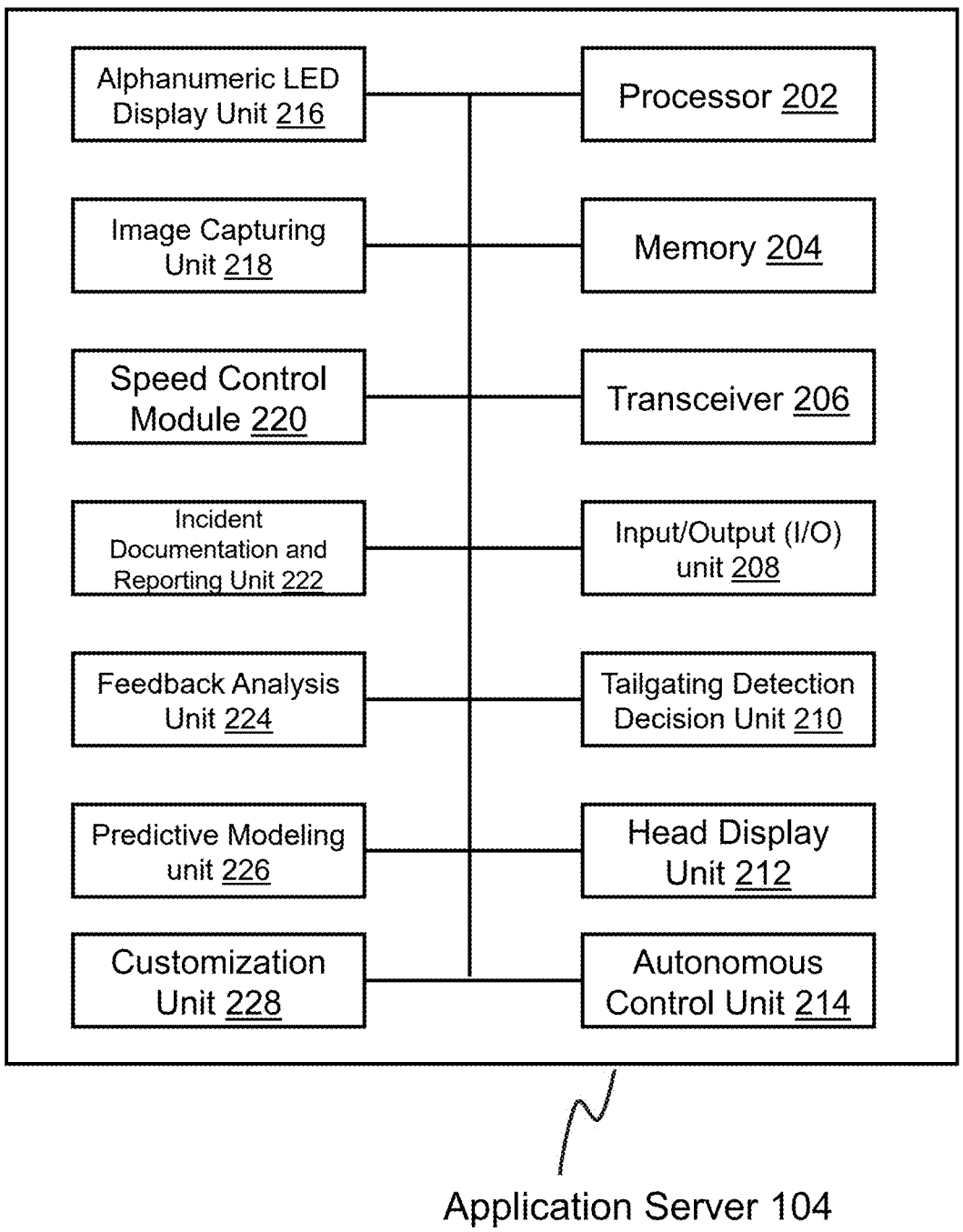
FIG. 2 is a block diagram that illustrates an application server configured for system and method to detect and mitigate tailgating, in accordance with an embodiment of present disclosure.

FIG. 2 is a block diagram that illustrates the application server 104 configured to handle the real-time analysis and decision-making processes critical for effective tailgating detection and mitigation, in accordance with an embodiment of the present invention. FIG. 2 is explained in conjunction with elements from FIG. 1. Here, the application server 104 preferably comprises a processor 202, a memory 204, a transceiver 206, an input/output unit 208, a tailgating detection decision unit 210, a head display unit 212, an autonomous control unit 214, an alphanumeric LED display unit 216, an imaging capturing unit 218, a speed control module 220, an incident documentation and reporting unit 222, a feedback analysis unit 224, a predictive modeling unit 226, and a customization unit 228.

The processor 202 comprises suitable logic, circuitry, interfaces, and/or code that may be configured to execute a set of instructions stored in the memory 204, and may be implemented based on several Processor 202 technologies known in the art. The processor 202 works in coordination with the memory 204, the transceiver 206, the input/output unit 208, the tailgating detection decision unit 210, the head display unit 212, the autonomous control system 214, the alphanumeric LED display unit 216, the imaging capturing unit 218, the speed control module 220, the incident documentation and reporting unit 222, the feedback analysis unit 224, the predictive modeling unit 226, and the customization unit 228. Examples of the processor 202 include, but not limited to, an X86-based processor, a Reduced Instruction Set Computing (RISC) processor, an Application-Specific Integrated Circuit (ASIC) processor, and a Complex Instruction Set Computing (CISC) processor.

The processor 202 in the application server 104 in the Vehicle Communication and Safety System. The processor 202 is responsible for receiving data from all connected sensors, which comprise LIDAR, SONAR, momentum sensors, and imaging cameras. These sensors continuously collect real-time data about the vehicle's surroundings, including the distance and speed of trailing vehicles, environmental conditions, and vehicle dynamics. The processor 202 aggregates the data, ensuring it is organized and ready for analysis. The processor 202 further is to run AI algorithms that analyze the incoming sensor data in real-time. The AI algorithms are designed to interpret complex datasets, identifying patterns and anomalies that indicate tailgating behavior. For instance, the processor evaluates the relative speed and distance of trailing vehicles, the vehicle's acceleration and deceleration patterns, and other contextual information. The real-time analysis performed by the processor enables the system to detect tailgating behavior accurately and promptly.

Upon detecting tailgating behavior, the processor 202 is responsible for making critical decisions regarding the appropriate responses, wherein the decisions comprise generating alerts to notify the driver through the head display unit 212, instructing the autonomous control unit 214 to adjust the vehicle's speed, and activating the alphanumeric LED displays 216 to warn the trailing driver. The processor ensures that these actions are coordinated and executed seamlessly, maintaining the system's overall effectiveness. The processor 202, ensuring that all components work together seamlessly. The processor 202 coordinates the flow of data between the sensors, memory 204, transceiver 206, input/output unit 208, and other modules. The processor's ability to manage the integration for the system's real-time operation. It ensures that data is processed and responses are executed without delay, enhancing the safety and reliability of the vehicle. By overseeing and harmonizing the functions of all system components, the processor 202 maintain the system's performance and ensures the safety of the vehicle and its occupants.

The memory 204 comprises suitable logic, circuitry, interfaces, and/or code that may be configured to store the set of instructions, which are executed by the processor 202. Preferably, the memory 204 is configured to store one or more programs, routines, or scripts that are executed in coordination with the processor 202. Additionally, the memory 204 may be implemented based on a Random Access Memory (RAM), a Read-Only Memory (ROM), a Hard Disk Drive (HDD), a storage server, and/or a Secure Digital (SD) card.

The memory 204 stores the AI algorithms that the processor 202 runs to analyze sensor data and detect tailgating behavior, wherein the algorithms are complex sets of instructions that enable the system to interpret real-time data and make intelligent decisions based on predefined rules and learned patterns, wherein algorithms are designed to handle large volumes of data, performing tasks such as pattern recognition, anomaly detection, and predictive analysis. By keeping these algorithms readily accessible, the memory ensures that the processor can quickly retrieve and execute them, allowing for real-time analysis and decision-making.

The Memory 204 also holds historical data, which comprises past sensor data, previous incidents of tailgating, responses taken by the system, and outcomes of those actions. The historical data is vital for the continuous improvement of the AI algorithms. By analyzing historical trends and patterns, the system can refine its models, improving the accuracy and effectiveness of its tailgating detection and mitigation strategies. This long-term data storage enables the system to learn from past experiences, adapting to new scenarios and enhancing its predictive capabilities. Memory 204 manages both short-term and long-term data storage needs. The memory 204 supports the overall functionality and reliability of the Vehicle Communication and Safety System, ensuring that it can respond effectively to real-time events while continually learning and improving over time.

The transceiver 206 comprises suitable logic, circuitry, interfaces, and/or code that may be configured to obtain one or more attributes associated with an application server. The Transceiver 206 enables wireless communication capabilities, allowing the device to connect to Wi-Fi networks, Bluetooth-enabled devices, or cellular networks. The connectivity facilitates data exchange, firmware updates, and remote configuration. The Transceiver 206 serves as the interface for transmitting and receiving data packets over wireless networks. This comprises exchanging information with other devices, accessing online resources, and transferring data to and from remote servers. The transceiver 206 supports various network protocols and standards, ensuring compatibility with different communication technologies. This versatility enables seamless integration with existing network infrastructures. The transceiver 206 may offer adjustable transmission power and bandwidth settings, allowing the device to optimize communication range and data transfer speeds based on environmental conditions and network requirements. The transceiver 206 incorporates security features such as encryption, authentication, and data integrity checks to ensure secure communication over wireless networks. This protects sensitive information and prevents unauthorized access. The transceiver 206 could be implemented as a hardware module within the electronic device, comprising radio frequency (RF) components, antennas, and signal processing circuitry. Alternatively, it could be integrated into the device's system-on-chip (SoC) or as a separate module connected via interfaces such as USB or PCIe.

The transceiver 206 is a component of the application server 104, responsible for managing communication between the application server and other system components within the Vehicle Communication and Safety System. The transceiver 206 facilitates the bidirectional exchange of data, ensuring seamless connectivity and coordination among sensors, the processor, the head display unit, the autonomous control unit, the alphanumeric LED displays, and the Imaging Capturing Unit. By handling the transmission and reception of real-time sensor data to the processor and distributing processed information and commands to relevant units, the transceiver 206 ensures that all parts of the system can interact efficiently and respond swiftly to detected tailgating behaviors, thereby maintaining the overall effectiveness and reliability of the vehicle safety system.

The Input/Output unit 208 comprises components such as buttons, touchscreens, or touchpads that serve as user interfaces for interacting with the device. These interfaces enable users to input commands, initiate actions, and navigate menus. A display screen, such as an LCD or OLED panel, is part of the Input/Output unit 208 and provides visual feedback to the user. The Input/Output unit 208 displays decoded information, user notifications, augmented reality (AR) overlays, and other graphical elements. The Input/Output unit 208 could be implemented as a combination of hardware components, including buttons, touchscreens, speakers, microphones, and ports, integrated into the device's physical design. Additionally, software components would interface with these hardware elements to manage input/output unit 208 operations and user interaction. The input/output unit 208 comprises of various input and output devices that are configured to communicate with the processor 202. Examples of the input devices include but are not limited to, a keyboard, a mouse, a joystick, a touch screen, a microphone, a camera, and/or a docking station. Examples of the output devices include, but are not limited to, a display screen and/or a speaker.

The input/output unit 208 is a component of the application server 104, tasked with collecting real-time data from the various sensors distributed around the vehicle. Acting as the primary interface for data flow, the input/output unit 208 gathers inputs from sensors such as LIDAR, SONAR, momentum sensors, and imaging cameras, which monitor the vehicle's surroundings. The input/output unit 208 then channels this sensor data into the system for processing by the processor 202. Additionally, input/output unit 208 serves as the conduit for output commands generated by the processor, ensuring that instructions for actions, such as speed adjustments by the autonomous control unit or alerts on the head display unit, are accurately delivered and executed. This dual role of managing both incoming data and outgoing commands is crucial for the seamless operation and responsiveness of the Vehicle Communication and Safety System.

The tailgating detection decision unit 210 is a component of the Vehicle Communication and Safety System, tasked with making the final determination on whether tailgating behavior is occurring. The tailgating detection decision unit 210 operates by analyzing the processed data received from various sensors, such as LIDAR, SONAR, momentum sensors, and imaging cameras. These sensors provide comprehensive real-time data about the vehicle's surroundings, including the distance and speed of trailing vehicles. The processor 202 uses AI algorithms to preprocess and analyze this sensor data, identifying patterns and behaviors that may indicate tailgating. The tailgating detection decision unit 210 then evaluates this processed data to make a definitive assessment.

The tailgating detection decision unit 210 is to ensure accurate detection of tailgating and to trigger appropriate responses. Accuracy in detecting tailgating is paramount, as false positives or missed detections can compromise the safety and effectiveness of the system. By utilizing advanced algorithms and real-time data, this unit can reliably determine when a trailing vehicle is following too closely. Upon confirming tailgating, the unit triggers a series of responses designed to mitigate the risk. These responses comprise alerting the driver through the head display unit 212, which provides real-time feedback and guidance. Additionally, The tailgating detection decision unit 210 may instruct the autonomous control unit 214 to adjust the vehicle's speed, ensuring a safe distance from the trailing vehicle. The unit also activates the alphanumeric LED displays 216 to communicate warnings to the trailing driver, such as "BACK OFF," "PLEASE PASS ME," or "PLEASE DO NOT TAILGATE MY CAR." By coordinating these actions, the tailgating detection decision unit 210 enhances vehicle safety, preventing rear-end collisions, and promoting safer driving behaviors The head display unit 212 is an interface component within the vehicle's dashboard, serving as the primary point of communication between the Vehicle Communication and Safety System and the driver. This display unit is designed to provide real-time feedback, alerts, and guidance to the driver, ensuring they are informed of any potential safety issues, particularly tailgating incidents. It integrates seamlessly with the vehicle's existing dashboard, offering an intuitive and easily accessible interface for the driver.

When the tailgating detection decision unit 210 identifies that a trailing vehicle is following too closely, the head display unit 212 immediately shows an alert to the driver. This alert is typically visual and may be accompanied by an auditory signal to ensure the driver's attention is quickly captured. The visual alert may comprise a warning message such as "Warning: Tailgating Detected" or "Vehicle Too Close Behind," clearly indicating the nature of the hazard.

In addition to alerting the driver to the presence of a tailgating vehicle, the head display unit 212 provides specific instructions and guidance on how to respond to the situation. This guidance might comprise suggestions such as "Increase Speed Safely" or "Change Lanes if Possible." The latter being especially relevant if the driver is detected as driving in left-hand lanes where some states restrict movement unless actively passing or in an HOV lane. In such a case, the message to the driver may be firmer, such as "Left Lane Driving Detected. Change Lanes if Possible." The instructions are dynamically generated based on real-time analysis of the traffic environment and the vehicle's current status, ensuring that the recommendations are both relevant and actionable.

The head display unit 212 enhancing driver awareness by continuously monitoring the vehicle's surroundings and alerting the driver to potential hazards. By providing timely and accurate information, it helps the driver make informed decisions, thereby improving overall road safety. The head display unit 212 ensures that the driver is always aware of the current status of the vehicle and any immediate risks, allowing for proactive management of driving behavior.

The design of the head display unit 212 prioritizes ease of use and minimal distraction. The interface is user-friendly, featuring clear, high-contrast text and graphics that are easily readable at a glance. This ensures that the driver can quickly understand and respond to the alerts and instructions without being overly distracted from the primary task of driving. The display is integrated into the vehicle's dashboard in a location that is easily visible to the driver, allowing for quick and effortless access to critical information.

The head display unit 212 is integrated with other components of the Vehicle Communication and Safety System, such as the autonomous control unit 214 and the alphanumeric LED displays 216. This integration ensures that the information displayed to the driver is consistent with the actions taken by the system. For example, if the system autonomously adjusts the vehicle's speed to create a safe distance from a trailing vehicle, the head display unit 212 will inform the driver of this action, providing a coherent and comprehensive view of the system's operations.

By providing real-time feedback, alerts, and instructions, the head display unit 212 significantly enhances the driver's ability to respond to tailgating incidents and other potential hazards, contributing to safer driving conditions and reduced risk of accidents.

The autonomous control unit 214 is a sophisticated component integrated with the vehicle's drivetrain, enabling it to directly control the vehicle's acceleration and deceleration. This integration allows the system to make real-time adjustments to the vehicle's speed in response to changing traffic conditions and potential hazards, particularly tailgating. By interfacing with the drivetrain, the autonomous control unit can modulate the throttle and braking systems, ensuring smooth and efficient speed control. This seamless integration is crucial for maintaining vehicle stability and ensuring that speed adjustments are both safe and effective.

The autonomous control unit 214 is to automatically adjust the vehicle's speed when tailgating is detected. Upon receiving data from the tailgating detection decision unit 210, the system assesses the situation and determines whether it is safe to increase the distance from the trailing vehicle by accelerating. If conditions allow, the autonomous control unit may take control of the vehicle's speed, gradually increasing it to create a safe buffer zone between the subject vehicle and the tailgating vehicle. This proactive approach helps prevent rear-end collisions by ensuring that the vehicle maintains a safe following distance, even in the absence of driver intervention.

The autonomous control unit 214 is designed to prioritize both safety and efficiency. When adjusting the vehicle's speed, the system considers various factors such as the speed of surrounding vehicles, road conditions, and traffic patterns. This ensures that any acceleration or deceleration is performed smoothly, without causing abrupt changes that could startle the driver or other road users. Additionally, the system continuously monitors the driving environment, making real-time adjustments as necessary to maintain a safe distance. By automating the speed control process, the autonomous control unit reduces the burden on the driver, allowing them to focus more on overall situational awareness and less on the immediate need to adjust speed in response to tailgating. This not only enhances safety but also contributes to a more relaxed and comfortable driving experience.

The alphanumeric LED displays 216 are strategically integrated into the rear headlights of the vehicle, serving as a direct communication tool between the subject vehicle and trailing drivers. These displays are designed to enhance road safety by providing clear and immediate visual warnings to drivers who are following too closely. By displaying concise and easily readable messages, such as "BACK OFF," "PLEASE PASS ME," or "PLEASE DO NOT TAILGATE MY CAR," the system aims to alert trailing drivers to their unsafe behavior and encourage them to increase their following distance. This proactive approach helps mitigate the risk of rear-end collisions and promotes safer driving habits.

The alphanumeric LED displays 216 operate in conjunction with the vehicle's sensor system and the tailgating detection decision unit 210. When the system detects that a trailing vehicle is following too closely, it sends a signal to the LED displays to activate the appropriate warning message. The messages are dynamically generated based on real-time data and the specific context of the tailgating incident. For example, the system may choose a more urgent message if the tailgating is particularly close or persistent. The LED technology ensures that the messages are bright and visible in various lighting conditions, including during the day, at night, and in adverse weather conditions. This visibility is crucial for ensuring that the trailing driver receives the warning promptly and can take corrective action.

The use of alphanumeric LED displays 216 significantly enhances the vehicle's ability to communicate with other drivers, thereby improving overall road safety. By providing immediate and clear feedback to trailing drivers, the system can effectively reduce instances of tailgating, which is a common cause of rear-end collisions. The psychological impact of receiving a direct and personal warning message can prompt trailing drivers to reconsider their behavior and maintain a safer following distance. Additionally, the presence of such a system can create a general awareness among drivers about the importance of maintaining adequate spacing on the road. The integration of these displays into the vehicle's safety system represents a forward-thinking approach to leveraging technology for real-time driver communication, ultimately contributing to a safer driving environment for everyone on the road.

The Imaging Capturing Unit 218 is seamlessly integrated into the rear lights of the vehicle, providing a discreet yet highly effective means of documenting incidents involving tailgating or other forms of dangerous driving. This system is designed to capture high-resolution still frames or video footage of the area behind the vehicle. By continuously monitoring and recording the behavior of trailing vehicles, the Imaging Capturing Unit ensures that there is a comprehensive visual record of any incidents. This capability is crucial for both immediate incident management and subsequent investigations, as it provides clear and irrefutable evidence of the events leading up to and during an incident.

The Imaging Capturing Unit 218 operates in real-time, automatically activating when the tailgating detection decision unit 210 identifies that a trailing vehicle is following too closely or behaving erratically. The system is equipped with advanced imaging sensors capable of capturing high-quality images and videos, regardless of lighting conditions. This ensures that the footage is clear and detailed, providing valuable visual evidence. The captured data is then stored in multiple locations: locally on the vehicle's onboard storage system, in the cloud for secure remote access, and optionally on the driver's mobile device for immediate review. This multi-faceted storage approach ensures that the data is protected against loss and is easily accessible when needed.

The presence of the Imaging Capturing Unit 218 significantly enhances the safety and accountability of all road users. For the driver of the subject vehicle, the system provides peace of mind, knowing that any tailgating incidents or dangerous driving behaviors are being recorded and can be used to support their case in the event of a dispute or accident. The Imaging Capturing Unit is also configured to capture license plate information of trailing vehicles, enabling the identification of the vehicle's owner. This information can be securely processed and, if necessary, transmitted to law enforcement authorities for further investigation or enforcement actions. For law enforcement and insurance companies, the recorded footage offers an unbiased account of the incident, simplifying the process of determining fault and processing claims. Furthermore, the knowledge that their actions are being recorded may deter trailing drivers from engaging in aggressive or reckless driving behaviors, thereby promoting a safer driving environment overall. This system exemplifies the proactive use of technology to improve road safety and ensure accountability, making it an essential component of the Vehicle Communication and Safety System.

The speed control module 220 is an integral component of the Vehicle Communication and Safety System, specifically designed to work in conjunction with the autonomous control unit 214. Its primary function is to regulate the vehicle's speed based on real-time data processed by the processor 202. This data comprises inputs from various sensors, such as LIDAR, SONAR, momentum sensors, and imaging cameras, which provide a comprehensive understanding of the vehicle's immediate environment, which may include presence and velocities of surrounding vehicles, current lane position of the vehicle, and vehicle speed. The speed control module uses this information to make precise adjustments to the vehicle's acceleration and deceleration, ensuring that the vehicle maintains a safe and appropriate speed at all times. This seamless integration is vital for the system's ability to respond dynamically to changing traffic conditions and potential hazards, such as tailgating.

The speed control module 220 plays a crucial role in ensuring both safety and efficiency. When the system detects that a trailing vehicle is following too closely, the speed control module receives a command from the processor to adjust the vehicle's speed. It then autonomously modulates the throttle and, if necessary, applies the brakes to increase the distance between the vehicles. This modulation is performed smoothly to avoid abrupt changes in speed that could destabilize the vehicle or create further hazards. By maintaining a safe following distance and adjusting speed in real-time, the speed control module helps prevent collisions and enhances the overall driving experience.

The speed control module 220 is particularly effective in maintaining optimal safety and efficiency in dynamic traffic conditions. It continuously monitors the vehicle's surroundings and makes instantaneous speed adjustments to adapt to the flow of traffic. For example, if the vehicle is in heavy traffic and the system detects frequent tailgating incidents, the speed control module can continuously adjust the vehicle's speed to maintain safe distances from other vehicles. In scenarios where the AI system determines that a lane change is a safer or more efficient solution, the speed control module coordinates speed adjustments with the lane change operation. This ensures that both actions are executed smoothly and safely, minimizing disruption to the flow of traffic and reducing the risk of collisions. This proactive approach not only reduces the risk of accidents but also improves traffic flow by preventing sudden stops and starts. Additionally, by optimizing the vehicle's speed, the module contributes to better fuel efficiency and reduced wear and tear on the vehicle's mechanical components. In essence, the speed control module 220 enhances the vehicle's capability to navigate complex driving environments safely and efficiently, ensuring a smoother and more secure driving experience for the occupants.

The Incident Documentation and Reporting unit 222 is a critical component of the Vehicle Communication and Safety System, designed to systematically handle the documentation of incidents and the reporting of relevant data to authorities. This unit works in tandem with other components, such as the Imaging Capturing Unit 218 and the processor 202, to ensure that all incidents of tailgating or dangerous driving are accurately recorded. When an incident occurs, the unit compiles data from various sensors and imaging devices, creating a comprehensive record that comprises high-resolution images, video footage, and detailed sensor data. This documentation is stored in multiple locations, including locally on the vehicle's onboard storage, in the cloud, and optionally on the driver's mobile device, to ensure data integrity and accessibility.

The Incident Documentation and Reporting unit 222 is to maintain detailed and accurate records of all tailgating incidents and other driving anomalies. This unit ensures that every aspect of the incident is documented, from the initial detection of tailgating by the tailgating detection decision unit 210 to the real-time actions taken by the autonomous control unit 214 and the speed control module 220. By integrating data from multiple sources, the unit provides a complete and chronological account of the incident, including timestamps, license plate information, vehicle speed, distance to the trailing vehicle, and the specific warnings displayed on the alphanumeric LED displays 216. This thorough documentation is essential for post-incident analysis, helping to identify patterns, improve system algorithms, and enhance overall vehicle safety.

The Incident Documentation and Reporting unit 222 ensuring timely and accurate reporting to law enforcement and other relevant authorities. When a serious tailgating incident or dangerous driving behavior is detected, the unit automatically generates a report that comprises all documented evidence. This report can be sent directly to authorities via a secure communication interface, enabling quick response and investigation. The ability to provide detailed and reliable evidence is invaluable for law enforcement, as it supports the enforcement of traffic laws and the prosecution of dangerous driving behaviors. Moreover, the system's ability to generate and send reports in real-time ensures that authorities are promptly informed, potentially preventing further incidents and enhancing road safety. By facilitating thorough documentation and timely reporting, the Incident Documentation and Reporting unit 222 not only supports immediate incident management but also contributes to long-term improvements in traffic safety and driver accountability.

The Feedback Analysis Unit 224 is an essential component of the Vehicle Communication and Safety System, designed to collect and analyze feedback from both the driver and the system itself. This unit integrates with other system components to gather comprehensive performance data, including the effectiveness of tailgating detection, the responsiveness of the autonomous control unit 214, and the clarity and impact of the alphanumeric LED displays 216. It also receives direct feedback from the driver, which can include subjective evaluations of the system's alerts and interventions. By compiling this data, the Feedback Analysis Unit provides a holistic view of how well the system is functioning in real-world conditions.

The Feedback Analysis Unit 224 is to evaluate the performance of the tailgating detection and mitigation processes. This involves analyzing quantitative data, such as the frequency and accuracy of tailgating detections, the timeliness of system responses, and the outcomes of these interventions. For example, the unit examines whether the system's actions successfully prevented potential collisions and how often drivers needed to manually intervene. Additionally, it assesses the quality of the data captured by the Imaging Capturing Unit 218 and the effectiveness of the communication with authorities facilitated by the Incident Documentation and Reporting unit 222. By systematically reviewing this performance data, the Feedback Analysis Unit identifies trends and patterns that can indicate strengths and weaknesses in the system.

The Feedback Analysis Unit 224 driving continuous optimization of the system. Based on the insights gained from its analyses, the unit provides actionable recommendations for system improvements. This can comprise refining AI algorithms used by the processor 202 to enhance detection accuracy, adjusting the parameters of the autonomous control unit 214 for smoother speed regulation, or improving the user interface of the head display unit 212 for better driver interaction. Feedback from drivers also plays a critical role, as it offers practical perspectives on user experience and system usability. By incorporating these insights, the Feedback Analysis Unit ensures that the Vehicle Communication and Safety System evolves and adapts, maintaining high standards of safety and effectiveness. This iterative process of evaluation and enhancement helps in building a more robust, reliable, and user-friendly system that can better handle the complexities of real-world driving environments.

The Predictive Modeling Unit 226 is a sophisticated component of the Vehicle Communication and Safety System, designed to enhance the system's ability to foresee and mitigate potential hazards. It leverages a combination of historical data and real-time inputs to create predictive models that anticipate future tailgating events and other driving risks. The unit integrates data from various sources, including historical incident records, sensor data, driver behavior patterns, and environmental conditions. By analyzing these diverse datasets, the Predictive Modeling Unit constructs detailed models that can predict the likelihood of tailgating and other hazardous situations. When the system determines that tailgating presents an imminent danger to the subject vehicle, it provides a warning to the driver through the head display unit. This warning can take the form of an audio alert, a visual warning in the form of text, or a graphic display, ensuring the driver is immediately aware of the potential risk and can take corrective action. This capability is crucial for transitioning from a reactive to a proactive safety system, allowing the vehicle to anticipate and address risks before they escalate.

The Predictive Modeling Unit 226 involves continuous analysis of both historical data and real-time inputs. Historical data provides a rich source of information on past incidents, including patterns and factors that led to tailgating and other dangerous behaviors. This data helps the unit to understand underlying trends and develop robust predictive algorithms. Simultaneously, real-time data from sensors, the processor 202, and other system components provide the current context, ensuring that predictions are based on the most up-to-date information. By combining these two data streams, the Predictive Modeling Unit can generate accurate forecasts about potential tailgating incidents and other risks, allowing the system to prepare and respond effectively.

The Predictive Modeling Unit 226 is enhancing the system's proactive safety measures. By accurately forecasting potential risks, the unit enables the system to take preemptive actions to mitigate these hazards. For instance, if the predictive model indicates a high likelihood of tailgating based on the current driving patterns and environmental conditions, the system can preemptively adjust the vehicle's speed or position to avoid the situation. It can also alert the driver through the head display unit 212, providing early warnings that allow for timely corrective actions. Additionally, the predictive insights can be used to optimize the settings and parameters of other system components, such as fine-tuning the sensitivity of the tailgating detection decision unit 210 or adjusting the response strategies of the autonomous control unit 214. By enabling these preemptive measures, the Predictive Modeling Unit significantly enhances the overall safety and efficiency of the Vehicle Communication and Safety System, making it more resilient to dynamic driving environments and better equipped to protect the vehicle and its occupants.

The Customization Unit 228 is a key component of the Vehicle Communication and Safety System that enables personalization of system settings according to driver preferences and specific vehicle characteristics. This unit is designed to provide flexibility and adaptability, allowing drivers to customize various aspects of the system to suit their individual needs and driving habits. It interfaces with the system's user interface, typically accessible through the head display unit 212, where drivers can adjust settings such as alert sensitivity, display preferences, and response thresholds. Additionally, it considers the unique characteristics of the vehicle, such as size, weight, and performance capabilities, to optimize system performance.

The Customization Unit 228 is to collect and implement driver-specific preferences and vehicle data to tailor the system's operations. Drivers can personalize how and when they receive alerts, the types of messages displayed on the alphanumeric LED displays 216, and the level of intervention by the autonomous control unit 214. For instance, a driver may prefer more frequent alerts in high-traffic areas but less intervention in open highway conditions. The unit also adjusts the system based on the vehicle's characteristics, ensuring that the safety measures are appropriate for different types of vehicles, such as sedans, SUVs, or trucks. This personalization ensures that the system operates in a manner that is comfortable and intuitive for the driver, enhancing user experience and acceptance.

The Customization Unit 228 is ensuring that the Vehicle Communication and Safety System can be adapted to meet the diverse needs of different drivers and driving environments. By allowing drivers to tailor the system settings, it enhances overall user satisfaction, as drivers feel more in control and confident in the system's capabilities. This adaptability also improves the system's effectiveness, as personalized settings are more likely to result in appropriate and timely responses to specific driving scenarios. Moreover, the unit's ability to adjust to vehicle-specific characteristics ensures that safety measures are optimally aligned with the vehicle's performance, leading to better handling and safer driving outcomes. In essence, the Customization Unit 228 transforms a one-size-fits-all approach into a dynamic, user-centric system that can cater to the unique needs of each driver, thereby maximizing both safety and user satisfaction.

In an exemplary operation, the application server 104 by by receiving data associated with a first vehicle and a second vehicle. In an embodiment, the data comprises real-time sensor data, historical driving behavior, vehicle-specific characteristics, and driver preferences. In an embodiment, the plurality of sources comprises LIDAR sensors, SONAR sensors, momentum sensors, imaging cameras, driver input via the head display unit, and external data sources such as weather and traffic conditions in order to enable the system to create a comprehensive understanding of the driving environment, facilitating accurate detection and mitigation of potential hazards, such as tailgating.

The application server 104 is configured to Collect and Analyse Real-Time Sensor Data, wherein sensors (LIDAR, SONAR, momentum sensors, and imaging cameras) continuously collect real-time data about the surrounding environment. This data comprises the distance and speed of trailing vehicles, the SUV's own speed and acceleration, and the overall traffic and weather conditions. The system accesses historical data stored in the memory 204, which comprises past instances of tailgating and the effectiveness of different mitigation strategies, wherein the system has previously customized system settings via the customization unit 228, specifying her preferred alert sensitivity and speed adjustment thresholds.

The application server 104 is configured to collect and analyze data from various sources to create a comprehensive understanding of the driving environment. Real-time data from LIDAR sensors 108, SONAR sensors 108, momentum sensors 108, and imaging cameras 108 continuously monitor the distance, speed, and behavior of surrounding vehicles, including the trailing vehicle. Historical driving behavior stored in memory 204 provides context and helps refine the system's algorithms. Additionally, vehicle-specific characteristics such as size, weight, and performance capabilities, along with driver preferences customized via the customization unit 228, are integrated to tailor the system's responses.

The application server 104 is configured to detect tailgating behavior by analyzing the collected data in real-time. The processor 202 runs AI algorithms that interpret sensor inputs to identify patterns indicative of tailgating. When a trailing vehicle follows too closely, the tailgating detection decision unit 210 confirms the hazardous behavior and determines the appropriate response based on the system's analysis.

The application server 104 is configured to respond promptly to detected tailgating incidents. The head display unit 212 alerts the driver with a message such as, "Warning: Tailgating Detected. Maintain Caution," and provides actionable guidance like "Increase Speed Safely" or "Change Lanes if Possible." Simultaneously, the autonomous control unit 214, supported by the speed control module 220, adjusts the vehicle's speed smoothly to increase the distance from the trailing vehicle. The alphanumeric LED displays 216 on the rear of the SUV communicate a clear warning, "BACK OFF," to the trailing driver.

In an embodiment, the application server 104 is configured to document and report incidents accurately. The Imaging Capturing Unit 218 records high-resolution video and still images of the tailgating incident, storing this data locally, in the cloud, and optionally on the driver's mobile device. If the tailgating persists or results in a near-miss, the incident documentation and reporting unit 222 generates a detailed report including all relevant data and sends it to the appropriate authorities for further action.

In an embodiment, the application server 104 is configured to conduct post-incident analysis and optimize system performance. The feedback analysis unit 224 reviews the system's response to the incident, evaluating the timeliness of alerts and the effectiveness of speed adjustments. The predictive modelling unit 226 uses this data to update its models, improving the system's ability to anticipate and mitigate future tailgating incidents. The customization unit 228 allows the driver to adjust settings based on the incident review, ensuring the system continues to meet their preferences and safety needs.

In the exemplary operation, the application server 104 seamlessly integrates data from various sources to detect and mitigate a tailgating incident. By leveraging real-time sensor inputs, historical data, vehicle-specific characteristics, and driver preferences, the system provides a personalized and effective response, ensuring the safety of the vehicle and its occupants while promoting safer driving behaviors. This comprehensive approach highlights the system's ability to adapt to different driving environments and individual driver needs, maximizing overall effectiveness and user satisfaction.

Figure 3:
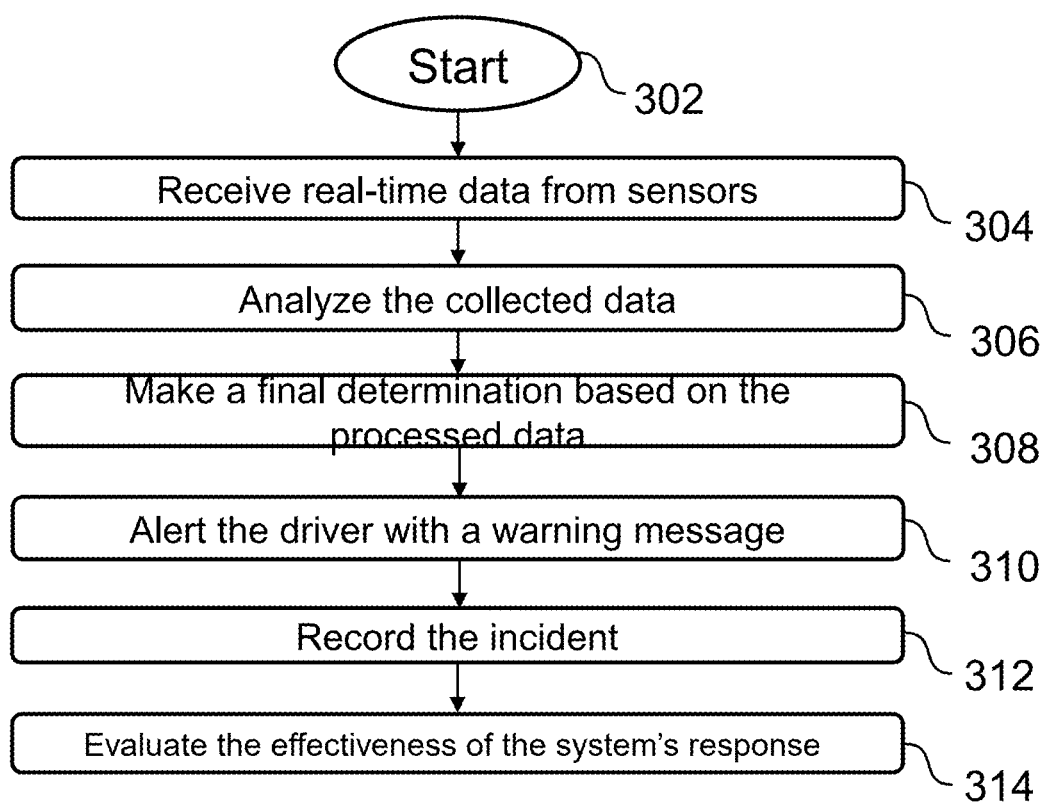
FIG. 3 is a flowchart that illustrates a method to detect and mitigate tailgating, in accordance with an embodiment of present disclosure.

FIG. 3 is a flowchart that illustrates a method 300 for detecting and mitigating tailgating behavior using AI-assisted technology and advanced sensor arrays, in accordance with an embodiment of the present disclosure. The method begins in a start step 302, initialization step involves setting up the Vehicle Communication and Safety System, ensuring that all components, including sensors, the application server, and the communication network, are operational and ready to collect and process data and proceeds to step 304. At step 304, an application server 104 receives real-time data from a variety of sensors integrated into the vehicle. The sensors 108 comprise, but are not limited to, LIDAR sensors, SONAR sensors, momentum sensors, and imaging cameras. The collected data encompasses information about the vehicle's surroundings, such as the distance and speed of trailing vehicles, as well as the vehicle's own speed, relative location, and acceleration. At step 306, the processor 202 in the application server 104 analyzes the collected data using AI algorithms stored in memory 204. These algorithms process the real-time sensor data to identify patterns and behaviors indicative of tailgating. The analysis comprises evaluating the relative distance and speed of the trailing vehicle to determine if it is following too closely. At step 308, the tailgating detection decision unit 210 in the application server 104 makes a final determination based on the processed data. If the unit confirms that tailgating behavior is occurring, it proceeds to the next step. This decision is crucial as it triggers the subsequent safety responses of the system. At step 310, an application server responds to the detected tailgating behavior. The head display unit 212 alerts the driver with a warning message, such as "Warning: Tailgating Detected. Maintain Caution," or "Change Lanes if Possible." Simultaneously, the autonomous control unit 214 and the speed control module 220 may adjust the vehicle's speed to create a safer distance from the trailing vehicle. The alphanumeric LED displays 216 on the rear of the vehicle also show a warning message like "BACK OFF," or "PLEASE PASS ME," to inform the trailing driver. At step 312, the Imaging Capturing Unit 218 in the application server 104 records the incident, capturing high-resolution video and still images. The incident documentation and reporting unit 222 stores this data locally, in the cloud, and optionally on the driver's mobile device. If necessary, a detailed report of the incident is generated and sent to relevant authorities. At step 314 the feedback analysis unit 224 in the application server 104 evaluates the effectiveness of the system's response to the tailgating incident. The predictive modeling unit 226 updates its models based on this feedback and the collected data, improving the system's ability to anticipate and mitigate future incidents. The customization unit 228 allows the driver to adjust system settings based on their preferences and experiences, ensuring continuous optimization of the system's performance.

The method begins at the start step 302. This initialization step involves setting up the Vehicle Communication and Safety System to ensure it is fully operational and ready to begin its function. During this phase, all critical components such as sensors (LIDAR sensors 108, SONAR sensors 108, momentum sensors 108, and imaging cameras 108), the application server 104, and the communication network 120 are checked and activated. The system performs self-diagnostics to confirm that each component is correctly calibrated and functioning. This comprises verifying that the sensors are accurately detecting environmental data, the processor 202 and memory 204 are ready to process and store data, and the transceiver 206 is capable of facilitating seamless communication between the various system components. Additionally, the head display unit 212 and other user interfaces are tested to ensure they can effectively communicate with the driver. This step sets the foundation for the subsequent steps, ensuring that the system is primed to collect, analyze, and respond to data in real-time for effective tailgating detection and mitigation.

In an embodiment, the application server 104 is configured to initialize the Vehicle Communication and Safety System. This setup involves ensuring all critical components, such as LIDAR sensors 108, SONAR sensors 108, momentum sensors 108, imaging cameras 108, the application server 104, and the communication network 120, are operational. The system performs self-diagnostics to verify that each component is correctly calibrated and functioning, ensuring the system is ready to collect and process data effectively.

At step 304, the application server 104 begins to receive real-time data from a variety of sensors integrated into the vehicle, including LIDAR sensors 108, SONAR sensors 108, momentum sensors 108, and imaging cameras 108. These sensors work together to provide a comprehensive understanding of the vehicle's immediate environment. The LIDAR sensors use laser pulses to measure distances to surrounding objects, creating detailed 3D maps of the area around the vehicle. SONAR sensors utilize sound waves to detect nearby objects and measure their distance, particularly useful for close-range detection. Momentum sensors capture the vehicle's acceleration and deceleration, providing insights into the vehicle's dynamic movements. Imaging cameras continuously capture visual data, offering real-time video and still images of the vehicle's surroundings. Collectively, this data comprises crucial information about the distance and speed of trailing vehicles, as well as the vehicle's own speed and acceleration, forming the basis for subsequent analysis and decision-making processes aimed at detecting and mitigating tailgating behavior.

In an embodiment, the application server 104 is configured to receive real-time data from various integrated sensors. These sensors collect comprehensive information about the vehicle's surroundings, including the distance and speed of trailing vehicles and the vehicle's own speed and acceleration. This real-time data forms the basis for subsequent analysis and decision-making processes aimed at detecting and mitigating tailgating behavior.

In step 306, the processor 202 within the application server 104 takes on the crucial task of analyzing the collected data using advanced AI algorithms stored in memory 204. These algorithms are specifically designed to process the real-time sensor data, which comprises inputs from LIDAR sensors, SONAR sensors, momentum sensors, and imaging cameras. The primary goal of this analysis is to identify patterns and behaviors that indicate tailgating. The AI algorithms evaluate the relative distance and speed of the trailing vehicle, comparing these metrics against predefined safety thresholds to determine whether the trailing vehicle is following too closely. This involves real-time calculations and pattern recognition, allowing the system to accurately assess the risk of tailgating. By continuously analyzing this data, the processor can quickly identify potential hazards, ensuring that the system remains vigilant and responsive to changing driving conditions.

In an embodiment, the application server 104 is configured to analyze the collected data using AI algorithms stored in memory 204. The processor 202 processes this data in real-time to identify patterns and behaviors indicative of tailgating. The analysis comprises evaluating the relative distance and speed of the trailing vehicle to determine if it is following too closely, ensuring accurate and timely detection of potential hazards.

At step 308, the tailgating detection decision unit 210 plays a pivotal role by making a final determination based on the processed data from the various sensors and the analysis performed by the processor 202. This unit evaluates the findings from the AI algorithms, specifically looking for indicators of tailgating behavior, such as the relative distance and speed of the trailing vehicle being below safe thresholds. If the decision unit confirms that tailgating is indeed occurring, it triggers the system's safety protocols, moving on to the next steps in the method. This decision point is crucial as it activates the appropriate responses designed to mitigate the identified risk, ensuring that the system can effectively respond to the tailgating incident by alerting the driver, adjusting vehicle speed, and warning the trailing driver through various integrated mechanisms.

In an embodiment, the application server 104 is configured to make a final determination on tailgating behavior through the tailgating detection decision unit 210. Based on the processed data, this unit confirms whether tailgating is occurring and triggers the next steps in the system's safety protocols, activating the necessary responses to address the detected hazard.

In step 310, the system responds proactively to the detected tailgating behavior to ensure the safety of the vehicle and its occupants. The head display unit 212 inside the vehicle's dashboard immediately alerts the driver with a clear warning message, such as "Warning: Tailgating Detected. Maintain Caution." This visual alert is designed to quickly capture the driver's attention and inform them of the potential danger. Simultaneously, the autonomous control unit 214, in conjunction with the speed control module 220, takes action to adjust the vehicle's speed. By smoothly accelerating or decelerating, the system creates a safer distance from the trailing vehicle, thereby reducing the risk of a rear-end collision. Additionally, the alphanumeric LED displays 216 integrated into the rear of the vehicle activate to show a warning message like "BACK OFF." This message directly communicates with the trailing driver, urging them to increase their following distance. Through these coordinated actions, the system not only informs and protects the driver but also actively manages the driving environment to enhance overall road safety.

In an embodiment, the application server 104 is configured to respond to detected tailgating behavior by alerting the driver and adjusting the vehicle's speed. The head display unit 212 shows a warning message, such as "Warning: Tailgating Detected. Maintain Caution," providing real-time guidance. Simultaneously, the autonomous control unit 214 and the speed control module 220 adjust the vehicle's speed to create a safer distance from the trailing vehicle. Additionally, the alphanumeric LED displays 216 on the rear of the vehicle show a warning message like "BACK OFF" to inform the trailing driver.

At step 312, the Imaging Capturing Unit 218 is activated to thoroughly document the tailgating incident. This system captures high-resolution video and still images of the event, ensuring that every detail is recorded accurately. The captured data comprises visual evidence of the tailgating behavior, the response actions taken by the vehicle, and the surrounding driving conditions. This visual and sensor data is then handled by the incident documentation and reporting unit 222, which securely stores the information in multiple locations: locally on the vehicle's onboard storage, in the cloud for remote access and backup, and optionally on the driver's mobile device for immediate review. If the incident is severe or requires further investigation, the system can automatically generate a detailed report. This report comprises all pertinent data and visual evidence, which can be sent to relevant authorities, such as law enforcement or insurance companies, to support any necessary follow-up actions. This comprehensive documentation process ensures that there is a clear and accessible record of the incident, enhancing accountability and facilitating accurate incident resolution.

In an embodiment, the application server 104 is configured to document the incident through the Imaging Capturing Unit 218. This system records high-resolution video and still images of the tailgating incident, storing the data locally, in the cloud, and optionally on the driver's mobile device. If necessary, the incident documentation and reporting unit 222 generates a detailed report, which is sent to relevant authorities for further investigation and action.

In the final step 314, the feedback analysis unit 224 takes center stage to evaluate the effectiveness of the system's response to the tailgating incident. This unit meticulously reviews all data and outcomes from the incident, including the timeliness and accuracy of the alerts, the efficiency of the autonomous control unit 214, and the overall impact on driving safety. Based on this comprehensive evaluation, the predictive modeling unit 226 updates its algorithms and models, incorporating the new data to enhance the system's predictive capabilities. This iterative learning process allows the system to better anticipate and mitigate future tailgating incidents by refining its response strategies. Additionally, the customization unit 228 enables the driver to personalize system settings according to their preferences and experiences. By allowing for adjustments in alert sensitivity, response aggressiveness, and other parameters, the system ensures that it remains user-friendly and aligned with individual driver needs. This continuous feedback loop and customization capability ensure that the Vehicle Communication and Safety System is constantly optimized, maintaining its effectiveness and reliability in various driving environments.

In an embodiment, the application server 104 is configured to evaluate and optimize system performance through the feedback analysis unit 224. This unit reviews the system's response to the tailgating incident, assessing the effectiveness of alerts and speed adjustments. The predictive modeling unit 226 updates its models based on this feedback and the collected data, enhancing the system's ability to anticipate and mitigate future incidents. The customization unit 228 allows the driver to adjust system settings based on their preferences and experiences, ensuring continuous optimization of the system's performance.

Various embodiments of the disclosure encompass numerous advantages including the system's integration of advanced sensors 108 such as LiDAR 108, SONAR 108, RADAR, momentum sensors 108, and imaging cameras 108 provides comprehensive real-time data collection. This allows for accurate and immediate detection of tailgating behavior, ensuring that potential hazards are identified and addressed promptly. The continuous monitoring and high precision of these sensors enhance the reliability and effectiveness of the system's safety measures. One another advantage of the present disclosure is that system Proactive Safety Measures, wherein the system can foresee potential tailgating incidents based on historical data and real-time inputs. This proactive capability enables the system to take preemptive actions, such as adjusting the vehicle's speed or alerting the driver, before the situation escalates. This foresight significantly reduces the likelihood of rear-end collisions and improves overall road safety The present disclosure allows drivers to personalize system settings based on their preferences and specific driving conditions. This adaptability ensures that the system's responses are tailored to individual needs, enhancing user satisfaction and effectiveness. Drivers can adjust alert sensitivity, response aggressiveness, and other parameters to suit their driving style and comfort level. The Present disclosure enables Comprehensive Incident Documentation by combining the imaging capture with the incident documentation and reporting unit 222, ensures thorough documentation of all incidents. High-resolution video and still images provide clear evidence of tailgating behavior and the system's responses. This data can be stored locally, in the cloud, and on mobile devices, facilitating easy access and sharing with authorities or insurance companies for further investigation and claims processing. The present disclosure allows Effective Communication with Trailing Drivers by integrating alphanumeric LED displays 216 into the rear of the vehicle to communicate clear warning messages to trailing drivers, such as "BACK OFF," "PLEASE PASS ME," or "PLEASE DO NOT TAILGATE MY CAR." This direct communication helps to mitigate tailgating behavior by informing and warning the following driver, promoting safer driving practices and reducing the risk of collisions.

The present disclosure enables Continuous System Improvement by feedback analysis unit 224 and the predictive modeling unit 226 work together to ensure continuous optimization of the system. By analyzing performance data and updating predictive models, the system learns and improves over time. This iterative process ensures that the system remains effective and up-to-date with the latest driving behaviors and safety standards. Furthermore, the present disclosure advances the state of the art by introducing a comprehensive, AI-driven approach to tailgating detection and mitigation, seamlessly integrating advanced sensors, predictive analytics, and real-time interventions to address a long-standing challenge in road safety. This innovation represents a significant improvement over traditional systems, which rely on static, rule-based algorithms, by enabling dynamic, data-driven responses that proactively anticipate and mitigate hazards. The present disclosure also provides Driver Confidence and Comfort by providing real-time alerts and guidance, keeping the driver informed and in control. This interface ensures that drivers receive timely warnings and actionable advice, enhancing their confidence and comfort on the road. The system's ability to automatically adjust the vehicle's speed through the autonomous control unit 214 and speed control module 220 further reduces driver stress and workload, contributing to a safer and more relaxed driving experience.

Figure 4:
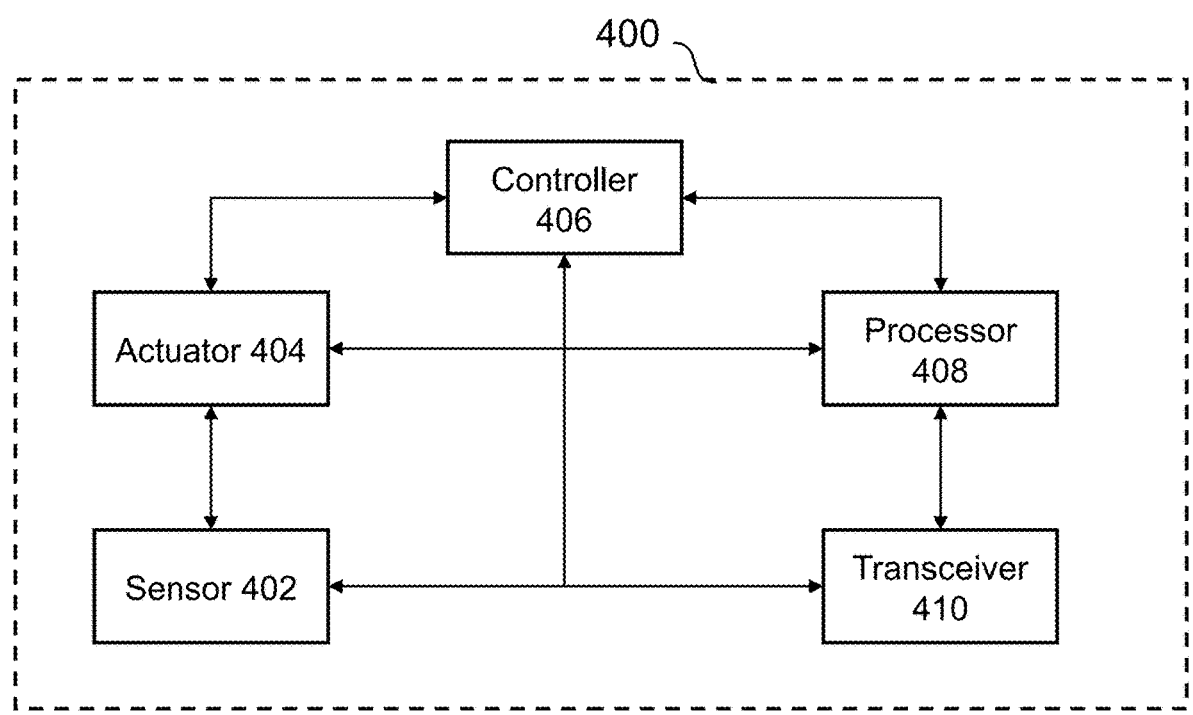
FIG. 4 illustrates a schematic block diagram illustrating an example apparatus, according to some embodiments of the present invention.

FIG. 4 illustrates a schematic block diagram illustrating an example apparatus, according to some embodiments of the present invention. The system may be capable of detecting and mitigating tailgating behavior in vehicle environment.

According to at least some embodiments of the present invention, the apparatus in FIG. 4 comprises one or more modules. These modules may e.g., be a sensor 402, an actuator 404, a controller 406, a processor 408, and a transceiver 410. The controller 406, may in some embodiments be adapted to control the above mentioned modules.

The sensor 402, the actuator 404, the processor 408, and the transceiver 410 as well as the controller 406, may be operatively connected to each other.

Optionally, the transceiver 410 may be adapted to receive an instruction for usage of the system 100.

The controller 406 may be adapted to control the steps as executed by the system 100 according to the instructions received by the transceiver 410. For example, the controller 406 may be adapted to activate the actuator 404 (as described above in conjunction with the FIG. 3). The actuator 404 may be an alphanumeric LED display integrated with a speaker.

Further, the processor 408 is adapted to perform the method and FIG. 1 in conjunction with the controller 406. The sensor 402 is adapted to detect the surrounding of the vehicle.

Figure 5:
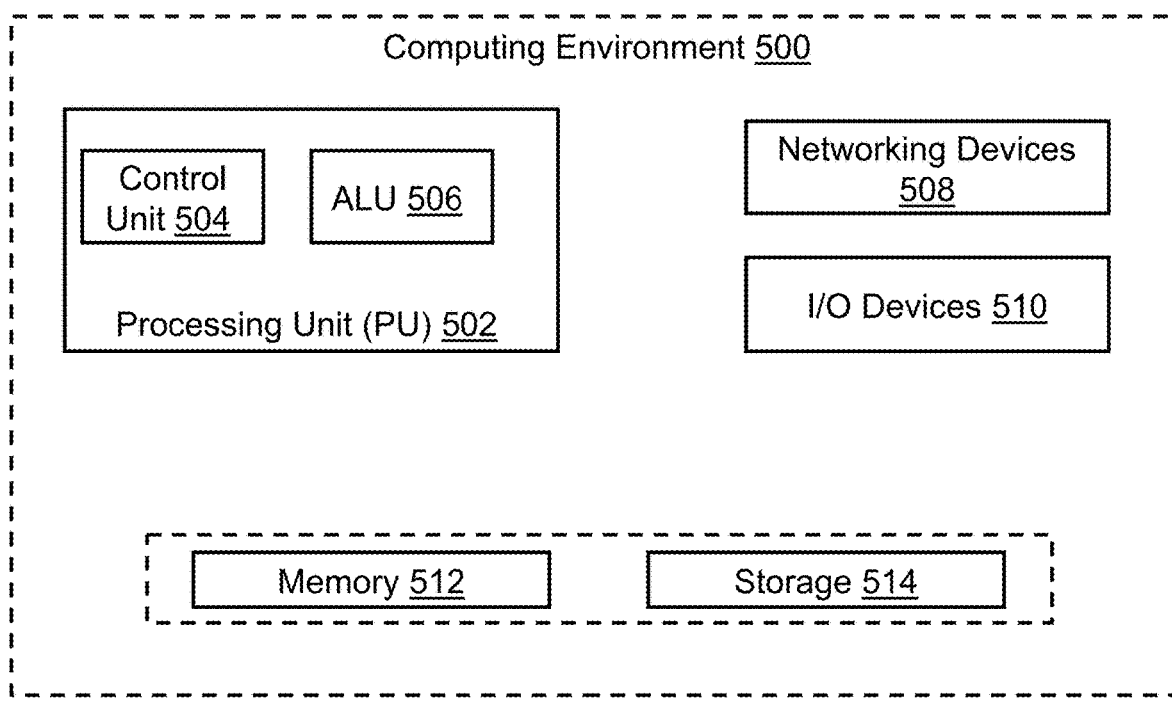
FIG. 5 illustrates an example computing environment implementing a system for preventing accidental fire, according to some embodiment of the present invention.

FIG. 5 illustrates an example of a computing environment implementing a system for detecting and mitigating tailgating behavior in a vehicle environment, according to some embodiment of the present invention. As depicted in FIG. 5, the computing environment 500 comprises at least one processing unit 502 that is equipped with a control unit 504 and an Arithmetic Logic Unit (ALU) 506, a plurality of networking devices 508 and a plurality Input output, I/O devices 510, a memory 512, and a storage 514. The processing unit 502 may be responsible for implementing the method described in FIGS. 1-3. For example, the processing unit 502 may in some embodiments be equivalent to the processor of the network node and the UE described above in conjunction with the FIGS. 1-3. The processing unit 502 is capable of executing software instructions stored in memory 512. The processing unit 502 receives commands from the control unit 504 in order to perform its processing. Further, any logical and arithmetic operations involved in the execution of the instructions are computed with the help of the ALU 506. The networking devices 508 enable communication between system components, and the I/O devices 510 facilitate interaction with external components such as sensors and displays. This computing environment forms the backbone of the Vehicle Communication and Safety System, ensuring seamless processing, storage, and transmission of data for real-time tailgating detection, mitigation, and documentation.

The computer program is loadable into the processing unit 502, which may, for example, be comprised in an electronic apparatus. When loaded into the processing unit 502, the computer program may be stored in the memory 512 associated with or comprised in the processing unit 502. According to some embodiments, the computer program may, when loaded into and run by the processing unit 502, cause execution of method steps according to, for example, any of the methods illustrated in FIGS. 1-3 or otherwise described herein.

The overall computing environment 500 may be composed of multiple homogeneous and/or heterogeneous cores, multiple CPUs of different kinds, special media and other accelerators. Further, the plurality of processing unit 502 may be located on a single chip or over multiple chips.

The algorithm comprising of instructions and codes required for the implementation are stored in either the memory 512 or the storage 512 or both. At the time of execution, the instructions may be fetched from the corresponding memory 512 and/or storage 512 and executed by the processing unit 502.

In case of any hardware implementations various networking devices 508 or external I/O devices 510 may be connected to the computing environment to support the implementation through the networking devices 508 and the I/O devices 510.

Figure 6:
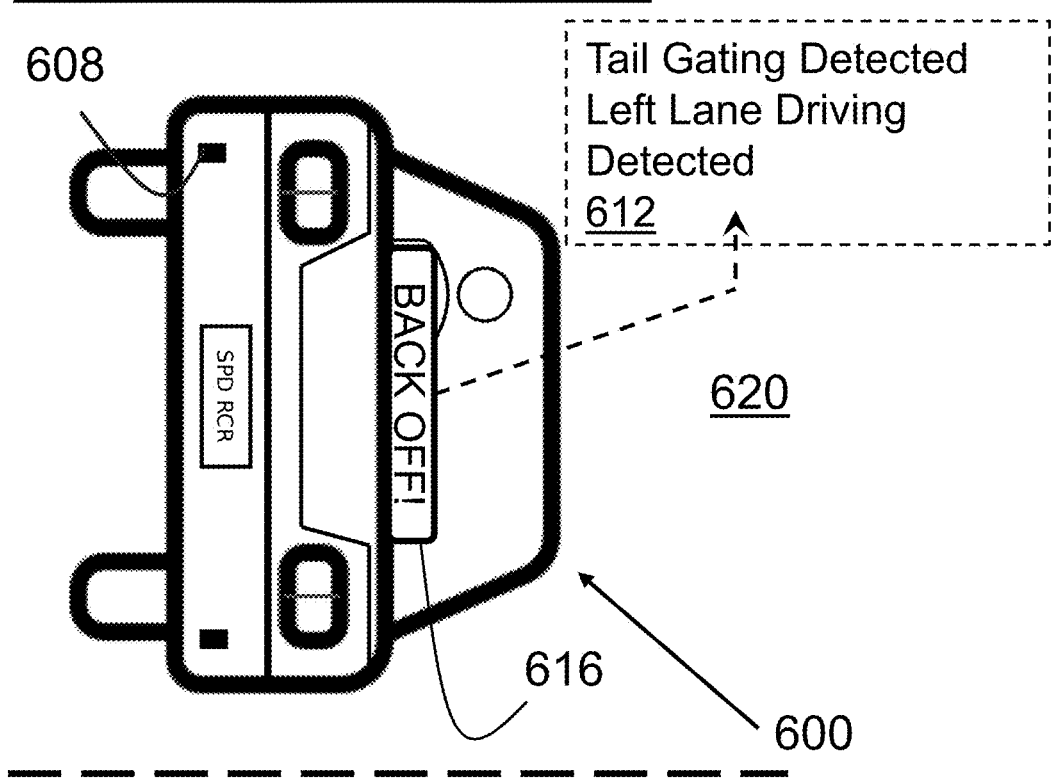
FIG. 6 is a schematic view of a messaging system of an embodiment of the invention.

A practical example of use may be seen in FIG. 6, where a driver, SPD RCR, is driving a vehicle 600 equipped with a simple embodiment of the present invention. In this example, right-lane driving conventions are being used—the driver is in the left-hand seat and the lane immediately adjacent opposing traffic is the left. It should be readily understood that for a left-lane driving convention the terminology "left lane" and right lane" would be reversed. SPD RCR is driving his vehicle in the left-most lane 620 of a three-lane highway, with center lane 623 and right lane 627. His vehicle 600 is equipped with sensors 608 that measure various environmental conditions, as is discussed earlier in this Specification. These sensors 608 may include, and not be limited to, LiDAR, RADAR, cameras, GPS sensors, and speed sensors. Sensors 608 may be positioned anywhere on vehicle 600 as is deemed expedient. The vehicle is equipped with both a rear display 616 and a heads-up display 612 which are operably connected to a control unit (not shown). The sensors may receive any information that the control unit and the tailgating detection decision unit need to make a tailgating determination. The control unit may also retrieve information from other sources, such a map programs and information online. Useful information could include presence, speed, and distance of trailing vehicles, vehicle lane position on the highway, vehicle speed, immediate speed limit, weather conditions, accident, construction, or other hazard notification, and presence of adjacent vehicles. All of this information is then used by the machine learning algorithm to create a situational profile of the vehicle and its surroundings. In the illustrated case, if a trailing vehicle is detected and determined to be too close for safety, based upon traffic conditions and general speed of the vehicles, the tailgating decision unit can then make a determination as to what messages to display and to whom. For instance, SPD RCR is in the left lane 620 and driving too slowly based on the conditions and speed limit. He is not actively passing and there are no emergency vehicles or hazards that would require him to be in the left lane. His position may be determined by recognition of an immediate solid yellow strip to the left and at least one dotted white stripes to the right. Speed is determined from the speed sensor while the GPS provides location, which may be cross-referenced with map databases and traffic condition websites to determine overall driving conditions. Imaging sensors can identify the presence or absence of hazards and other vehicles and their relative positions to SPD RCR's vehicle 600. All of this information is collected to make a determination of left-lane driving. Once left-lane driving is detected, the tailgating decision unit can provide a message to SPD RCR on the heads-up display 612 "LEFT LANE DRIVING DETECTED" to encourage SPD RCR to move over and avoid receiving a citation. Since SPD RCR is in the left lane, if tailgating by another vehicle is also detected then the only way for a trailing driver to pass him is on the right-hand side, a generally discouraged practice. Instead of sending a message 616 to the trailing driver that says "PASS ME" the tailgating decision unit may send another message like "BACK OFF" or perhaps something more polite given SPD RCR's breech of driving etiquette. The tailgating decision unit may then also alert SPD RCR on the heads-up display. The situation may then be resolved depending upon the action of the drivers, or activation of autonomous mode. As an example, if SPD RCR recognizes his error and can safely move over, he may activate his turn signal, which then might trigger the tailgating decision unit to send a message of "I'M MOVING OVER" to the trailing vehicle.

The embodiments disclosed herein can be implemented through at least one software program running on at least one hardware device and performing network management functions to control the elements. The elements shown in FIG. 5 include blocks which can be at least one of a hardware device, or a combination of hardware device and software module.

The present disclosure represents a unique combination and application of several advanced techniques and technologies. The specific integration and interplay of these elements demonstrate a level of innovation that goes beyond what is obvious to a person skilled in the art. The use of reinforcement learning and predictive neural networks for real-time adaptation and proactive content generation is an innovative application of these models in the context of conversational AI. Multi-modal interaction integrating text, voice, and visual inputs within a single coherent system, represents a significant technical advancement in user interaction design. Real-Time feedback and adaptation the dynamic adaptation of conversational content based on real-time biometric feedback and interaction patterns involves sophisticated real-time data processing and analysis that are not trivial or obvious. Federated learning for privacy implementing federated learning techniques to train models across multiple devices while ensuring privacy is a complex approach to enhancing data security and model training efficiency.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments falling within the scope of the appended claims.

What is claimed is:

1. A method for detecting and mitigating tailgating behavior in vehicle environment, the method comprising:
   receiving, by an application server, real-time data from a plurality of sensors integrated into a first vehicle, wherein the real-time data comprises information related to rear surroundings of the first vehicle;
   analyzing, by the application server, the real-time data using Artificial Intelligence (AI) models stored in a memory, to detect patterns and behaviors of a trailing vehicle;
   identifying, by the application server, tailgating behavior based on the detected patterns and behaviors of the trailing vehicle;
   validating, by the application server, accuracy of the identified tailgating behavior using the AI models, wherein the AI models are dynamically updated based on feedback, historical driving behavior, and contextual data including weather, road infrastructure, and traffic conditions;
   generating, by the application server, an alert to a user of the first vehicle based on the validation of the accuracy of the identified tailgating behavior, wherein the alert comprises a warning message and a guidance message for the user of the first vehicle; and
   enabling, by the application server, an autonomous control system integrated with the vehicle to adjust speed of the first vehicle based on the alert, wherein the speed of the first vehicle is adjusted to maintain a safe distance from the trailing vehicle.

2. The method as claimed in claim 1, further comprising controlling, by the application server, an alphanumeric Light Emitting Diode (LED) display-installed on the first vehicle, the display configured to display the warning message and the guidance message, wherein the LED display is integrated into rear headlights of the first vehicle, and is further configured to display customizable messages input by the user of the first vehicle.

3. The method as claimed in claim 2, wherein the alphanumeric Light Emitting Diode (LED) display together with an integrated speaker system is further configured to provide audio alerts.

4. The method as claimed in claim 1, further comprising recording, by the application server, high-resolution video and still images of tailgating incidents using an imaging capture system integrated into rear of the first vehicle, wherein the imaging capture system includes night vision capabilities to ensure high-quality recording in low-light conditions.

5. The method as claimed in claim 4, further comprising generating reports for relevant authorities based on the high-resolution video and the still images of the tailgating incidents.

6. The method as claimed in claim 1, further comprising updating, by the application server, the AI models based on feedback and collected data to anticipate and mitigate future incidents.

7. The method as claimed in claim 1, wherein the sensors comprise image sensors, LIDAR sensors, RADAR sensors, and infrared sensors.

8. The method as claimed in claim 1, wherein the sensors comprise radar sensors configured to enhance the detection of surrounding objects.

9. The method as claimed in claim 1, wherein the autonomous control system is further configured to collaborate with a lane-keeping assist system to ensure optimal vehicle positioning during speed adjustments.

10. The method of claim 1, wherein the contextual data includes license plate information.

11. A system for detecting and mitigating tailgating behavior in vehicle environment, the system comprising:
   a processor; and
   a memory communicatively coupled with the processor, wherein the memory stores processor-executable instructions, which on execution cause the processor to:
      receive real-time data from a plurality of sensors integrated into a first vehicle, wherein the real-time data comprises information related to rear surroundings of the first vehicle;
      analyze the real-time data using Artificial Intelligence (AI) models stored in the memory, to detect patterns and behaviors of a trailing vehicle;
      identify tailgating behavior based on the detected patterns and behaviors of the trailing vehicle;
      validate accuracy of the identified tailgating behavior using the AI models, wherein the AI models are dynamically updated based on feedback, historical driving behavior, and contextual data including weather, road infrastructure, and traffic conditions;
      generate an alert to a user of the vehicle based on the validation of the accuracy of the identified tailgating behavior, wherein the alert comprises a warning message and a guidance message for the user of the first vehicle; and
      enable an autonomous control system integrated with the vehicle to adjust speed of the first vehicle based on the alert, wherein the speed of the vehicle is adjusted to maintain a safe distance from the trailing vehicle.

12. The system as claimed in claim 11, wherein the processor is further configured to control an alphanumeric Light Emitting Diode (LED) display installed on the vehicle to display the warning message and the guidance message, wherein the LED display is integrated into rear headlights of the first vehicle and is further configured to display customizable messages input by the user of the first vehicle.

13. The system as claimed in claim 11, wherein the processor is further configured to record high-resolution video and still images of tailgating incidents using an imaging capture system integrated into the rear of the first vehicle, wherein the imaging capture system includes night vision capabilities to ensure high-quality recording in low-light conditions.

14. The system as claimed in claim 13, wherein the processor is further configured to generate reports for relevant authorities based on the high-resolution video and the still images of the tailgating incidents.

15. The system as claimed in claim 11, wherein the processor is further configured to update the AI models based on feedback and collected data to anticipate and mitigate future incidents.

16. The system as claimed in claim 11, wherein the sensors comprise image sensors, LIDAR sensors, RADAR sensors, and infrared sensors.

17. The system as claimed in claim 11, wherein the sensors comprise radar sensors configured to enhance the detection of surrounding objects.

18. The system as claimed in claim 11, wherein the autonomous control system is further configured to collaborate with a lane-keeping assist system to ensure optimal vehicle positioning during speed adjustments.

* * * * *